(12) United States Patent
He et al.

(10) Patent No.: US 11,907,112 B2
(45) Date of Patent: Feb. 20, 2024

(54) METHOD AND APPARATUS FOR CALCULATING TENSOR DATA WITH COMPUTER, MEDIUM, AND DEVICE

(71) Applicant: Horizon (Shanghai) Artificial Intelligence Technology Co., Ltd, Shanghai (CN)

(72) Inventors: Haoqian He, Shanghai (CN); Weina Lu, Shanghai (CN); Chao He, Shanghai (CN)

(73) Assignee: Horizon (Shanghai) Artificial Intelligence Technology Co., Ltd, Shanghai (CN)

( * ) Notice: Subject to any disclaimer, the term of this patent is extended or adjusted under 35 U.S.C. 154(b) by 0 days.

(21) Appl. No.: 17/765,775

(22) PCT Filed: Nov. 24, 2020

(86) PCT No.: PCT/CN2020/131064
§ 371 (c)(1),
(2) Date: Mar. 31, 2022

(87) PCT Pub. No.: WO2022/007311
PCT Pub. Date: Jan. 13, 2022

(65) Prior Publication Data
US 2022/0374347 A1 Nov. 24, 2022

(30) Foreign Application Priority Data

Jul. 9, 2020 (CN) .......................... 202010655451.4

(51) Int. Cl.
*G06F 12/02* (2006.01)
(52) U.S. Cl.
CPC .............................. *G06F 12/0207* (2013.01)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS 5,333,291 A * 7/1994 Grunbok ............. G06F 12/0207
711/E12.003
5,860,076 A * 1/1999 Greene ................ G11C 7/1006
711/E12.003
(Continued)

FOREIGN PATENT DOCUMENTS

CN 105531602 A 4/2016
CN 109215372 A 1/2019
(Continued)

OTHER PUBLICATIONS

TVM: An Automated End-to-End Optimizing Compiler for Deep Learning; Chen et al.; Oct. 5, 2018; retrieved from https://arxiv.org/pdf/1802.04799.pdf? (Year: 2018).*
(Continued)

*Primary Examiner* — Daniel C. Chappell

(57) ABSTRACT

Embodiments of the present disclosure disclose a method and apparatus for calculating tensor data based on a computer, a medium, and a device. The method includes: determining, from a second tensor, a dimension different from a dimension of a first tensor based on dimensions of the first tensor and dimensions of the second tensor; updating stride in the different dimension to a predetermined value; reading a to-be-operated data block of the second tensor from a buffer module based on updated stride with the predetermined value in each dimension of the second tensor, where the to-be-operated data block is a data block for which padding processing is performed; and performing binary operation on the first tensor based on the to-be-operated data block of the second tensor. According to the present disclo-
(Continued)

sure, broadcasting may be conveniently achieved without difficulty of hardware design being increased.

16 Claims, 4 Drawing Sheets

(58) Field of Classification Search
CPC ............... G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | |
|---|---|---|---|---|
| 9,779,786 | B1 * | 10/2017 | Wu | G06V 10/454 |
| 9,875,104 | B2 * | 1/2018 | Woo | G06F 9/355 |
| 11,467,973 | B1 * | 10/2022 | Diamant | G06N 3/063 |
| 11,636,569 | B1 * | 4/2023 | Xu | G06N 3/08 |
| | | | | 382/156 |
| 2014/0181171 | A1 * | 6/2014 | Dourbal | G06F 17/16 |
| | | | | 708/607 |
| 2017/0323224 | A1 * | 11/2017 | Bruestle | G06N 20/00 |
| 2018/0034484 | A1 * | 2/2018 | Galbraith | H03M 13/256 |
| 2019/0042092 | A1 * | 2/2019 | Wu | G06N 3/045 |
| 2019/0129794 | A1 | 5/2019 | Lingarajappa | |
| 2019/0130291 | A1 * | 5/2019 | Nicol | G06N 5/043 |
| 2020/0174707 | A1 * | 6/2020 | Johnson | G06F 12/0207 |
| 2020/0192803 | A1 * | 6/2020 | Sun | G06F 12/10 |
| 2022/0159860 | A1 * | 5/2022 | Winzer | G02B 6/428 |
| 2022/0244465 | A1 * | 8/2022 | Winzer | G02B 6/3608 |
| 2022/0391320 | A1 * | 12/2022 | Song | G06F 17/16 |
| 2022/0392117 | A1 * | 12/2022 | Akutsu | G06T 3/4046 |

FOREIGN PATENT DOCUMENTS

| | | | | |
|---|---|---|---|---|
| CN | 109886399 | A | 6/2019 | |
| CN | 110050267 | A | 7/2019 | |
| CN | 110837483 | A | 2/2020 | |
| CN | 111767508 | A | 10/2020 | |
| EP | 3855367 | A1 * | 7/2021 | G06F 17/16 |
| WO | 2018126073 | A1 | 7/2018 | |

OTHER PUBLICATIONS

L. Zhuo, G. R. Morris and V. K. Prasanna, "High-Performance Reduction Circuits Using Deeply Pipelined Operators on FPGAs," in IEEE Transactions on Parallel and Distributed Systems, vol. 18, No. 10, pp. 1377-1392, Oct. 2007, doi: 10.1109/TPDS.2007.1068. (Year: 2007).*
International Search Report (in English and Chinese) and Written Opinion of the International Searching Authority (Chinese) issued in PCT/CN2020/131064, dated Apr. 9, 2021; ISA/CN.
Extended Search Report in corresponding European Patent Application No. 20944539.4 dated Sep. 8, 2023.
Cowan et al., "Automatic Generation of High-Performance Quantized Machine Learning Kernels"; In Proceedings of the 18th ACM/IEEE International Symposium on Code Generation and Optimization (CGO '20), Feb. 22-26, 2020, San Diego, CA, USA. ACM, New York, NY, USA, 12 pages.
Chen, Tianqu et al.; "TVM: An Automated End-to-End Optimizing Compiler for Deep Learning"; arXiv:1802.04799v3 [cs.LG] Oct. 5, 2018 (airXiv.org).
Kenji Nakakuki, Introduction to Python for Scientific and Technical Computing, 1st Edition, Japan, Gijutsu Hyoronsha, Inc, Oct. 25, 2016, pp. 242-246 (with English translation provided by Chinable).
Office Action dated Apr. 11, 2023, in corresponding Japanese Application No. 2022-519784 (with English translation provided by Chinable).
Office Action dated Jun. 19, 2023, in corresponding Chinese Application No. 202010655451.4.

* cited by examiner

S300. Determine, from a second tensor, a dimension different from a dimension of a first tensor based on dimensions of the first tensor and dimensions of the second tensor

S301. Update stride in the foregoing different dimension to a predetermined value

S302. Read a to-be-operated data block of the second tensor from a buffer module based on updated stride with the foregoing predetermined value in each dimension of the second tensor

S303. Perform binary operation on the first tensor based on the to-be-operated data block of the second tensor

FIG.3

S400. Buffer valid data of a second tensor into a buffer module based on non-updated stride in each dimension of the second tensor

S401. Determine a buffer area of the valid data for padding processing in the buffer module based on updated stride with a predetermined value in each dimension of the second tensor

S402. Copy the valid data in the foregoing determined buffer area and pad out the corresponding buffer area with the copied valid data, to form a to-be-operated data block of the second tensor

FIG.4

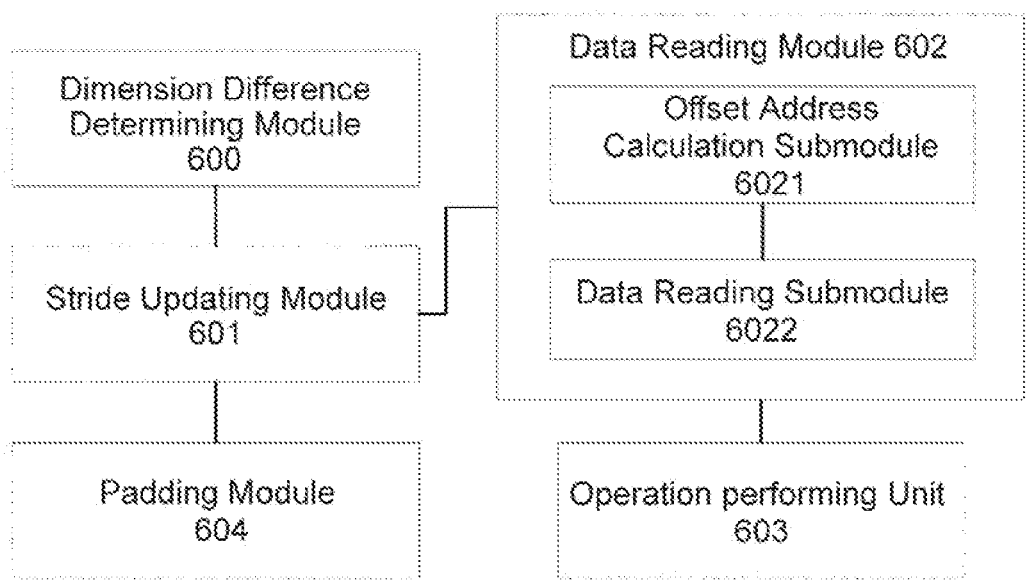
FIG.5
FIG.6
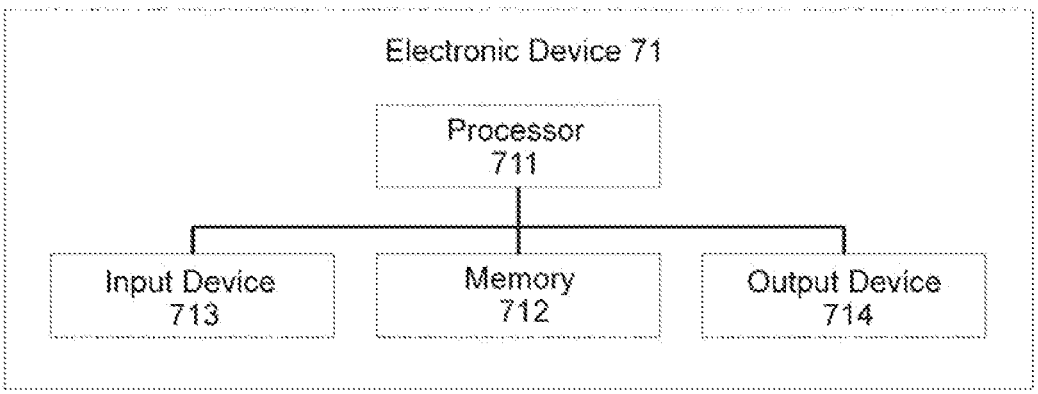
FIG.7

METHOD AND APPARATUS FOR CALCULATING TENSOR DATA WITH COMPUTER, MEDIUM, AND DEVICE

CROSS-REFERENCE TO RELATED APPLICATIONS

This application is a U.S. National Phase Application under 35 U.S.C. 371 of International Application No. PCT/CN2020/131064, filed on Nov. 24, 2020, which claims priority to the Chinese patent application No. CN 202010655451.4, filed with the Chinese Patent Office on Jul. 9, 2020 and entitled "METHOD AND APPARATUS FOR CALCULATING TENSOR DATA BASED ON COMPUTER, MEDIUM, AND DEVICE", which are incorporated herein by reference in their entirety.

FIELD OF THE INVENTION

The present disclosure relates to data processing technologies, and in particular, to a method for calculating tensor data based on a computer, an apparatus for calculating tensor data based on a computer, a storage medium, and an electronic device.

BACKGROUND OF THE INVENTION

Generally, a binary operation may be performed only for two tensors with same dimensions. For example, an addition operation may be performed for a tensor of 2×3 and another tensor of 2×3. In a case in which dimensions of two tensors are not the same (especially the dimensions of the two tensors are different, and at least one dimension of one of the tensors is 1), hardware that supports broadcasting may perform a binary operation for the two tensors.

If the hardware supports broadcasting, difficulty of hardware design is usually increased. It is a technical issue worthy of attention how to quickly perform a binary operation for tensors with different dimensions without increasing the difficulty of hardware design.

SUMMARY OF THE INVENTION

To resolve the foregoing technical problem, the present disclosure is proposed. Embodiments of the present disclosure provide a method and apparatus for calculating tensor data based on a computer, a storage medium, and an electronic device.

According to an aspect of an embodiment of the present disclosure, a method for calculating tensor data based on a computer is provided, including: determining, from a second tensor, a dimension different from a dimension of a first tensor based on dimensions of the first tensor and dimensions of the second tensor; updating stride in the different dimension to a predetermined value; reading a to-be-operated data block of the second tensor from a buffer module based on updated stride with the predetermined value in each dimension of the second tensor, where the to-be-operated data block is a data block for which padding processing is performed; and performing binary operation on the first tensor based on the to-be-operated data block of the second tensor.

According to yet another aspect of an embodiment of the present disclosure, an apparatus for calculating tensor data based on a computer is provided, where the apparatus includes: a dimension difference determining module, configured to determine, from a second tensor, a dimension different from a dimension of a first tensor based on dimensions of the first tensor and dimensions of the second tensor; a stride updating module, configured to update stride in the different dimension determined by the dimension difference determining module to a predetermined value; a data reading module, configured to read a to-be-operated data block of the second tensor from a buffer module based on stride with the predetermined value in each dimension of the second tensor updated by the stride updating module, where the to-be-operated data block is a data block for which padding processing is performed; and an operation performing unit, configured to perform binary operation on the first tensor based on the to-be-operated data block of the second tensor read by the data reading module.

According to yet another aspect of an embodiment of the present disclosure, a computer readable storage medium is provided, where the storage medium stores a computer program, and the computer program is used for implementing the foregoing method.

According to still another aspect of an embodiment of the present disclosure, an electronic device is provided, where the electronic device includes: a processor; and a memory configured to store a processor-executable instruction, where the processor is configured to read the executable instruction from the memory and execute the instruction to implement the foregoing method.

According to the method and apparatus for calculating tensor data based on a computer that are provided in the foregoing embodiments of the present disclosure, through updating the stride in the different dimension of the second tensor, a reading position of the buffer module may be positioned to a position of the data block for which padding processing is performed. Updating of the stride, positioning of the reading position of the buffer module, the padding processing, and other operations may all be performed by means of compiling. Therefore, during implementation of the embodiments of the present disclosure, according to the present disclosure, without hardware supporting broadcasting, a binary operation between tensors with different dimensions may be quickly performed by reading the to-be-operated data block from a corresponding reading position and enabling a data processing unit to perform an existing binary operation on the first tensor and the read to-be-operated data block. In view of the above, according to the technical solutions provided in the present disclosure, a binary operation may be performed to tensors with different dimensions without difficulty of hardware design being increased.

The technical solutions of the present disclosure are further described in detail below with reference to the accompanying drawings and embodiments.

BRIEF DESCRIPTION OF THE DRAWINGS

By describing the embodiments of the present disclosure more in detail with reference to the accompanying drawings, the foregoing and other objectives, features, and advantages of the present disclosure will become more apparent. The accompanying drawings, constituting a part of the specification, are provided for further understanding of the embodiments of the present disclosure and for explaining the present disclosure together with the embodiments of the present disclosure, and are not construed to limit the present disclosure. In the accompanying drawings, same reference signs generally represent same components or steps.

FIG. 3 is a flowchart of a method for calculating tensor data based on a computer according to an embodiment of the present disclosure;

FIG. 4 is a flowchart of forming a to-be-operated data block of a second tensor according to an embodiment of the present disclosure;

FIG. 5 is a flowchart of buffering valid data of a second tensor according to an embodiment of the present disclosure;

FIG. 6 is a schematic structural diagram of an apparatus for calculating tensor data based on a computer according to an embodiment of the present disclosure; and FIG. 7 is a structural diagram of an electronic device according to an exemplary embodiment of this application.

DETAILED DESCRIPTION OF THE EMBODIMENTS

Figure 1:
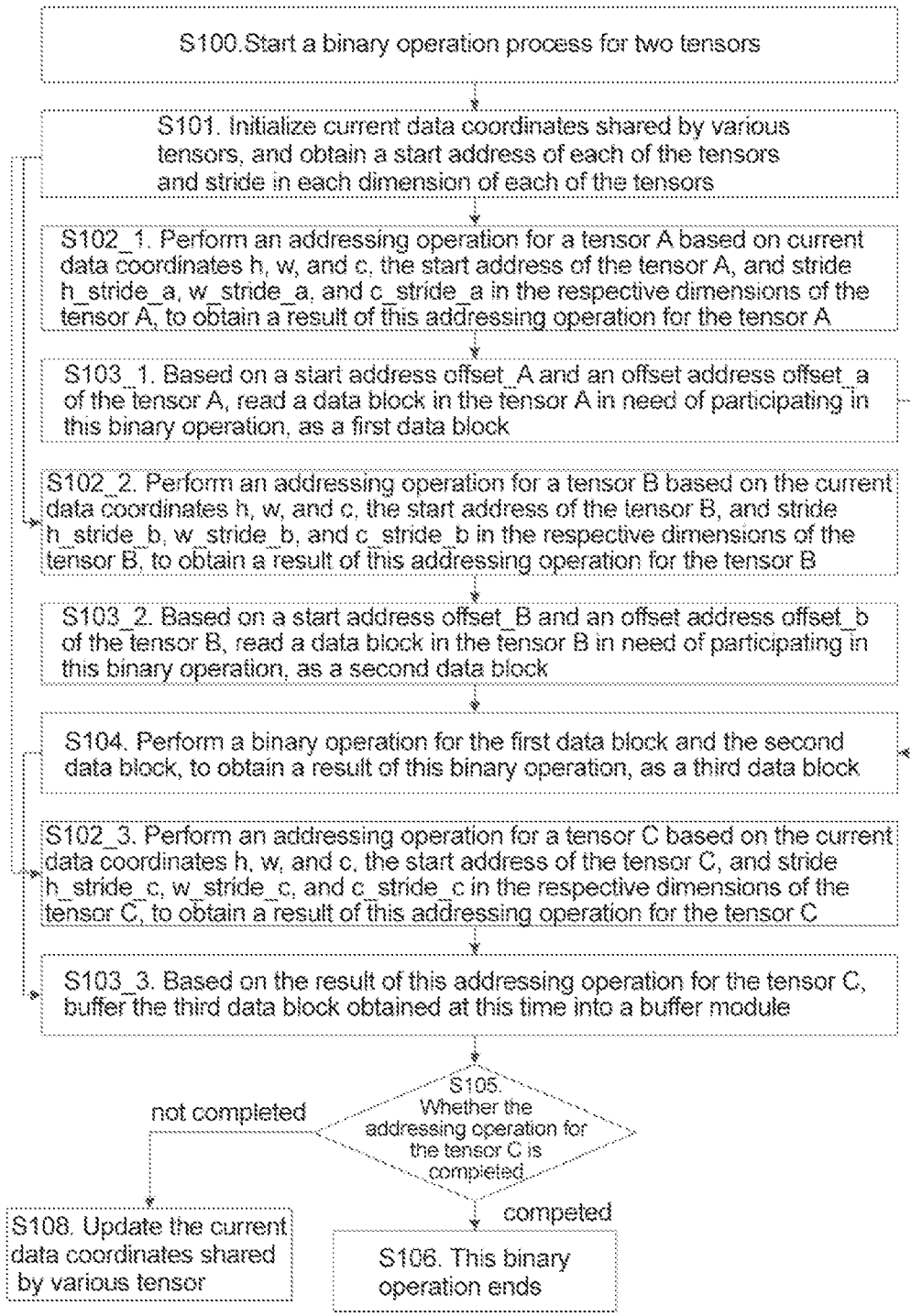
FIG. 1 is a flowchart of an embodiment of a scenario to which the present disclosure is applicable.

Exemplary embodiments of the present disclosure are described below in detail with reference to the accompanying drawings. Obviously, the described embodiments are merely a part, rather than all of embodiments of the present disclosure. It should be understood that the present disclosure is not limited by the exemplary embodiments described herein.

It should be noted that unless otherwise specified, the scope of the present disclosure is not limited by relative arrangement, numeric expressions, and numerical values of components and steps described in these embodiments.

A person skilled in the art may understand that terms such as "first" and "second" in the embodiments of the present disclosure are merely used to distinguish among different steps, devices, modules, or the like, and indicate neither any particular technical meaning, nor necessarily logical ordering of them.

It should be further understood that, in the embodiments of the present disclosure, the term "multiple/a plurality of" may refer to two or more; and the term "at least one" may refer to one, two, or more.

It should be further understood that, any component, data, or structure involved in the embodiments of the present disclosure may be generally construed to one or more, unless clearly stated or the context indicates otherwise.

In addition, the term "and/or" in the present disclosure refers to only an association relationship that describes associated objects, indicating presence of three relationships. For example, A and/or B may indicate presence of three cases: A alone, both A and B, and B alone. In addition, the character "/" in the present disclosure generally indicates an "or" relationship among associated objects.

It should be further understood that, the descriptions of the various embodiments of the present disclosure focus on differences among the various embodiments. The same or similar parts among the embodiments may refer to one another. For concision, description is not repeated.

Meanwhile, it should be understood that, for ease of description, the accompanying drawings are not necessarily to scale in size of any of parts shown therein.

Descriptions of at least one exemplary embodiment below are actually illustrative only, not construed as any limitation to the present disclosure along with application or use thereof.

Technologies, methods, and devices known by a person of ordinary skills in the related fields may not be discussed in detail herein. However, where appropriate, the technologies, the methods, and the devices shall be regarded as a part of the specification.

It should be noted that, similar reference signs and numerics in the following accompanying drawings indicate similar items. Therefore, once a certain item is defined in one of the accompanying drawings, it is not necessary to further discuss the item in the subsequent accompanying drawings.

The embodiments of the present disclosure may be applicable to a terminal device, a computer system, a server, and other electronic devices, which may be operated together with numerous other general-purpose or special-purpose computing system environments or configurations. Well-known examples of the terminal device, the computing systems, and environment and/or configuration applicable to be used with the terminal device, the computer system, the server, and other electronic devices include but not limited to: a personal computer system, a server computer system, a thin client, a thick client, a handheld or laptop device, a microprocessor-based system, a set-top box, programmable consumer electronics, a network personal computer, a small computer systems, a mainframe computer system, and a distributed cloud computing technology environment including any of the foregoing systems, and the like.

The terminal device, the computer system, the server, and other electronic devices may be described in general context of a computer system-executable instruction (such as a program module) executed by the computer system. Generally, the program module may include a routine, a program, a target program, a component, logic, a data structure, and the like that execute particular tasks or implement particular abstract data types. The computer system/server may be implemented in a distributed cloud computing environment. In the distributed cloud computing environment, a task is performed by a remote processing device linked through a communications network. In the distributed cloud computing environment, the program module may be located on a storage medium of a local or remote computing system including a storage device.

Application Overview

In a process of implementing the present disclosure, the inventor finds that in the course of image processing and audio processing, there are usually a large number of binary operations among tensors. A binary operation between two tensors with a same dimension may be conveniently performed by using a prior data processing chip (such as a CPU or a co-processor). However, all data processing chips cannot support execution of a binary operation between two tensors with different dimensions.

Exemplary Overview

The technology of calculating tensor data based on a computer in the present disclosure may be applicable to processes such as image processing and audio processing. For example, the technical solutions provided in the present disclosure may be applicable to application scenarios such as automatic driving and voice recognition. Whether an image processing process or an audio processing process usually involves in a binary operation for two tensors with different dimensions.

It is assumed that two tensors for which a binary operation need to be performed are tensor A and tensor B, respectively, where the tensor A is a tensor of 16×16×8 (h×w×c), and the tensor B is a tensor of 1×1×8 (h×w×c). It is assumed that a binary operation result of the tensor A and the tensor B is a tensor C, and the tensor C is a tensor of 16×16×8 (h×w×c). It is assumed that a data processing chip can simultaneously perform 128 binary operations at a time. It is assumed that a buffer module may store 128 data by a basic data storage unit.

Figure 2:
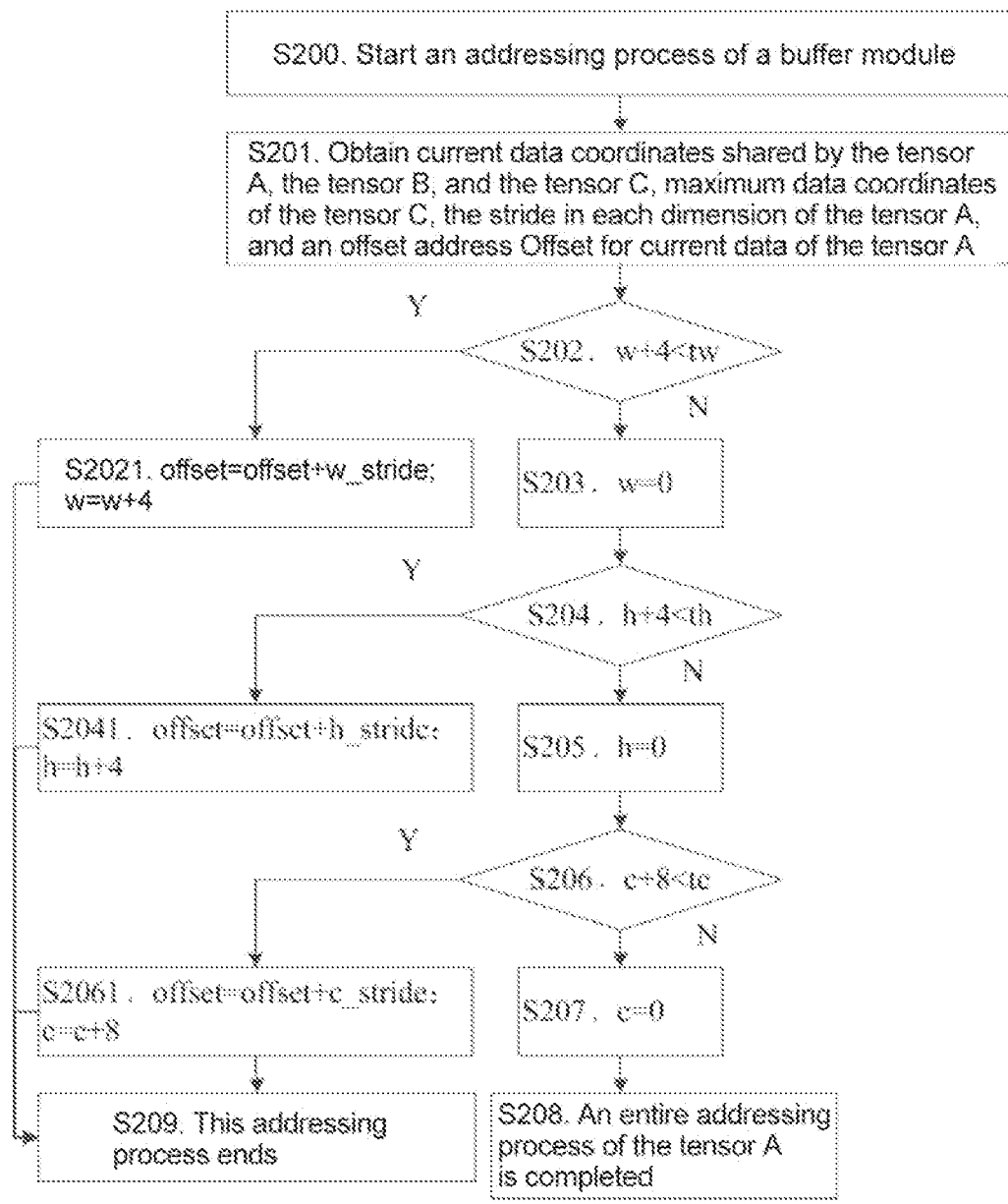
FIG. 2 is a flowchart of an embodiment of an addressing process of a scenario to which the present disclosure is applicable.

Under the foregoing assumptions, an example of a process of performing the binary operation for the tensor A and the tensor B in the present disclosure is shown in FIG. 1 and FIG. 2.

In FIG. 1, S100. Start a process of a binary operation for two tensors.

S101. Initialize current data coordinates shared by various tensors, and obtain a start address of each of the tensors, stride in each dimension of each of the tensors, and a maximum data coordinate of each of the tensors.

Optionally, the current data coordinates are shared by the tensor A, the tensor B, and the tensor C in the present disclosure. According to the present disclosure, current data coordinates h, w, and c shared by the tensor A, the tensor B, and the tensor C are respectively initialized. For example, h, w, and c are all initialized to 0. h, w, and c may represent a position, in the tensor, of a data in the tensor. According to the present disclosure, the start address of the tensor A and the stride in each dimension of the tensor A may be obtained based on current input. A buffer start address of the tensor A in the buffer module, obtained in the present disclosure, may be indicated by offset_A. The stride in each dimension of the tensor A may be used to represent an interval of data in the tensor A in a row direction of the buffer module when the tensor A is buffered in the buffer module.

The stride of the tensor A in an h dimension, the stride of the tensor A in a w dimension, and the stride of the tensor A in a c dimension, obtained in the present disclosure, may be respectively indicated by h_stride_a (e.g., 4), w_stride_a (e.g., 4), and c_stride_a (e.g., 8).

Optionally, according to the present disclosure, the start address of the tensor B and the stride in each dimension of the tensor B may be obtained based on current input. A buffer start address of the tensor B in the buffer module, obtained in the present disclosure, may be indicated by offset_B.

The stride of the tensor B in the h dimension, the stride of the tensor B in the w dimension, and the stride of the tensor B in the c dimension, obtained in the present disclosure may be respectively indicated by h_stride_b (e.g., 1), w_stride_b (e.g., 1), and c_stride_b (e.g., 8). There is a difference between the stride of the tensor B in the h dimension and the stride of the tensor A in the h dimension, and there is a difference between the stride of the tensor B in the w dimension and the stride of the tensor A in the w dimension. Moreover, the stride of the tensor B in the h dimension is smaller than the stride of the tensor A in the h dimension, and the stride of the tensor B in the w dimension is smaller than the stride of the tensor A in the w dimension. Therefore, according to present disclosure, the stride h_stride_b of the tensor B in the h dimension may be updated to 0, the stride w_stride_b of the tensor B in the w dimension may be updated to 0, and the stride c_stride_b of the tensor B in the c dimension is still 8.

Optionally, according to the present disclosure, the start address of the tensor C and the stride in each dimension of the tensor C may be obtained based on current input. A buffer start address of the tensor C in the buffer module, obtained in the present disclosure, may be indicated by offset_C.

The stride of the tensor C in the h dimension, the stride of the tensor C in the w dimension, and the stride of the tensor C in the c dimension, obtained in the present disclosure, may be respectively indicated by h_stride_c (e.g., 4), w_stride_c (e.g., 4), and c_stride_c (e.g., 8).

S102_1. Perform an addressing operation for a tensor A based on current data coordinates h, w, and c, the start address of the tensor A, and stride h_stride_a, w_stride_a, and c_stride_a in the respective dimensions of the tensor A, to obtain a result of this addressing operation for the tensor A, that is, obtain an offset address offset_a of the tensor A. Proceed to S103-1.

This addressing operation for the tensor A may refer to an addressing operation performed for obtaining a data block in the tensor A in need of participating in this binary operation. A result of this addressing operation for the tensor A may be an offset address offset_a relative to a buffer start address offset_A of the tensor A in the buffer module. As a result of this addressing operation for the tensor A, it also may be that all addressing operations for the tensor A and all binary calculation operations for the tensor A are completed. For a process of addressing the tensor A, reference may be made to related description in FIG. 2. S103_1. Based on a start address offset_A and the offset address offset_a of the tensor A, read a data block in the tensor A in need of participating in this binary operation, as a first data block. Proceed to S105.

S102_2. Perform an addressing operation for a tensor B based on the current data coordinates h, w, and c, the start address of the tensor B, and stride h_stride_b, w_stride_b, and c_stride_b in the respective dimensions of the tensor B, to obtain a result of this addressing operation for the tensor B, that is, obtain an offset address offset_b of the tensor B. Proceed to S103-2.

This addressing operation for the tensor B may refer to an addressing operation performed for obtaining a data block in the tensor B in need of participating in this binary operation. A result of this addressing operation for the tensor B may be an offset address offset_b relative to a buffer start address offset_B of the tensor B in the buffer module. As a result of this addressing operation for the tensor B, it also may be that all addressing operations for the tensor B and all binary calculation operations for the tensor B are completed. A process of addressing the tensor B is similar to the process of addressing the tensor A, and details are not described herein again.

S103_2. Based on a start address offset_B and the offset address offset_b of the tensor B, read a data block in the tensor B in need of participating in this binary operation, as a second data block. Proceed to S105.

S104. Perform a binary operation for the first data block and the second data block, to obtain a result of this binary operation, as a third data block. Proceed to S103_3.

S102_3. Perform an addressing operation for a tensor C based on the current data coordinates h, w, and c, the start address of the tensor C, and stride h_stride_c, w_stride_c, and c_stride_c in the respective dimensions of the tensor C, to obtain a result of this addressing operation for the tensor C, that is, obtain an offset address offset_c of the tensor C. Proceed to S103-3.

This addressing operation for the tensor C may refer to an addressing operation performed for obtaining a storage location, in the buffer module, of the data block as the result of this binary operation for the tensor C. A result of this addressing operation for the tensor C may be an offset address offset_c relative to a buffer start address offset_C of the tensor C in the buffer module. As a result of this addressing operation for the tensor C, it also may be that all addressing operations and all binary calculation operations for the tensor C are completed. A process of addressing the tensor C is basically the same as the process of addressing the tensor A, and details are not described herein again.

S103_3. Based on a start address offset_C and the offset address offset_c of the tensor C, buffer the third data block obtained in S104 into a buffer module. Proceed to S105.

S105. Determine whether the addressing operation for the tensor C is completed; if the addressing operation is completed, proceed to S106; and if the addressing operation is not completed, proceed to S107.

Optionally, if the current data coordinate h is greater than a maximum data coordinate h_maxc of the tensor C, the current data coordinate w is greater than a maximum data coordinate w_maxc of the tensor C, and the current data coordinate c is greater than a maximum data coordinate c_maxc of the tensor C, the addressing operation for the tensor C is completed.

S106. This binary operation process for the tensor A and the tensor B ends.

S107. Update the current data coordinates shared by various tensor, and return to S102_1, S102_2, and S102_3.

In FIG. 2, S200. Start an addressing process of a buffer module.

S201. Obtain current data coordinates shared by the tensor A, the tensor B, and the tensor C, maximum data coordinates of the tensor C, the stride in each dimension of the tensor A, and an offset address for current data of the tensor A.

Optionally, the current data coordinates shared by the tensor A, the tensor B, and the tensor C may represent positions, in the tensor A, of data that currently needs to be addressed. The current data coordinates shared by the tensor A, the tensor B, and the tensor C may include current data coordinates of the tensor in all directions. For example, the current data coordinates shared by the tensor A, the tensor B, and the tensor C may include: a current data coordinate of the tensor in a w direction, a current data coordinate of the tensor in an h direction, and a current data coordinate of the tensor in a c direction. The maximum data coordinate of the tensor C may represent a data size of the tensor C. The maximum data coordinates of the tensor C may include maximum data coordinates in all directions of the tensor C. For example, the maximum data coordinates of the tensor C may include: a maximum data coordinate of the tensor C in the w direction, a maximum data coordinate of the tensor C in the h direction, and a maximum data coordinate of the tensor C in the c direction. The stride in each dimension of the tensor A is usually a preset known value. An initial value of the offset address for the current data of the tensor A may be the start address of the tensor A.

S202. Determine whether a sum of a current data coordinate w of the tensor in a w direction and 4 is smaller than a maximum data coordinate tw of the tensor C in the w direction; if the sum is smaller than the maximum data coordinate tw, proceed to S2021; and if the sum is not smaller than the maximum data coordinate tw, proceed to S203.

S2021. Update the offset address for the current data of the tensor A to a sum of the offset address for the current data and stride w_stride of the tensor A in the dimension in the w direction, and update the current data coordinate w of the tensor in the w direction to the sum of the current data coordinate w of the tensor in the w direction and 4. Proceed to S209.

S203. Update the current data coordinate of the tensor in the w direction to 0. Proceed to S204.

S204. Determine whether a sum of a current data coordinate h of the tensor in an h direction and 4 is smaller than a maximum data coordinate th of the tensor C in the h direction; if the sum is smaller than the maximum data coordinate th, proceed to S2031; and if the sum is not smaller than the maximum data coordinate th, proceed to S205.

S2041. Update the offset address for the current data of the tensor A to a sum of the offset address for the current data and stride h_stride of the tensor A in the dimension in the h direction, and update the current data coordinate h of the tensor in the h direction to the sum of the current data coordinate h of the tensor in the h direction and 4. Proceed to S209.

S205. Update the current data coordinate of the tensor in the h direction to 0. Proceed to S206.

S206. Determine whether a sum of a current data coordinate c of the tensor in a c direction and 8 is smaller than a maximum data coordinate tc of the tensor C in the c direction; if the sum is smaller than the maximum data coordinate tc, proceed to S2061; and if the sum is not smaller than the maximum data coordinate tc, proceed to S207.

S2061. Update the offset address for the current data of the tensor A to a sum of the offset address for the current data and stride c_stride of the tensor A in the dimension in the c direction, and update the current data coordinate c of the tensor in the c direction to the sum of the current data coordinate c of the tensor in the c direction and 8. Proceed to S209.

S207. Update the current data coordinate of the tensor in the c direction to 0. Proceed to S208.

S208. An entire addressing process of the tensor A is completed.

S209. This addressing process ends.

Exemplary Method

FIG. 3 is a flowchart of a method for calculating tensor data based on a computer according to an embodiment of the present disclosure. The method shown in FIG. 3 includes S300, S301, S302, and S303. The steps are described below, respectively.

S300. Determine, from a second tensor, a dimension different from a dimension of a first tensor based on dimensions of the first tensor and dimensions of the second tensor.

The tensor in the present disclosure may refer to a multiple linear mapping defined on a Cartesian product of some vector spaces and some dual spaces. The tensor may be considered as a quantity having n components in coordinates in an n-dimensional space. Each of components of the tensor is a function of the coordinates. During coordinate transformation, each component of the tensor is also linearly transformed according to corresponding rules. If it is assumed that the tensor is understood as a multi-dimensional array, dimensions of the tensor may be considered as respective dimensionalities of all dimensions of the array. To be specific, the dimension of the tensor in the present disclosure generally includes a plurality of values, and each value represents a number of data (that is, a dimensionality) of the tensor in a corresponding direction. For example, FIG. 3 shows a two-dimensional array, and dimensions of the two-dimensional array is (3, 2). In other words, the two-dimensional array has an x-direction dimension of 3 and a y-direction dimension of 2.

In the present disclosure, the dimensions of the second tensor are different from those of the first tensor. For example, the dimensions of the first tensor and the second tensor may be completely different or may be partially different. In other words, at least the dimension in one direction of the second tensor is a dimension different from the dimensions of the first tensor.

For example, the dimensions in some directions of the second tensor are the same as the dimensions in the corresponding directions of the first tensor, and the dimensions in other directions of the second tensor are different from the dimensions in the corresponding directions of the first tensor. Specifically, it is assumed that the first tensor is a 4-dimensional array, and an n-direction dimension, an h-direction dimension, a w-direction dimension, and a c-direction dimension of the first tensor respectively are 4, 4, 4, and 8; and it is assumed that the second tensor is a 4-dimensional array, and an n-direction dimension, an h-direction dimension, a w-direction dimension, and a c-direction dimension of the second tensor respectively are 1, 4, 4, and 8. Under the foregoing assumptions, the n-direction dimensions of the first tensor and the second tensor are different, and the h-direction dimensions, the w-direction dimensions, and the c-direction dimensions of the first tensor and the second tensor are all the same. In other words, the n-direction dimension of the second tensor is the dimension different from the dimension of the first tensor.

For another example, the dimensions in all directions of the second tensor are respectively the same as the dimensions in the corresponding directions of the first tensor. Specifically, it is assumed that the first tensor is a 4-dimensional array, and an n-direction dimension, an h-direction dimension, a w-direction dimension, and a c-direction dimension of the first tensor respectively are 4, 4, 4, and 8; and it is assumed that the second tensor is a 4-dimensional array, and an n-direction dimension, an h-direction dimension, a w-direction dimension, and a c-direction dimension of the second tensor respectively are 1, 1, 1, and 1. Under the foregoing assumptions, the n-direction dimensions, the h-direction dimensions, the w-direction dimensions, and the c-direction dimensions of the first tensor and the second tensor are all different. In other words, the n-direction dimension, the h-direction dimension, the w-direction dimension, and the c-direction dimension of the second tensor all are dimensions that are different from the dimensions of the first tensor.

It should be particularly noted that, for a neural network, the foregoing n may represent a number of inputs of the neural network, h may represent a height of an image or audio data, w may represent a width of the image or the audio data, and c may represent a number of channels of each point (for example, a pixel) in the image or the audio data. For example, for the image, each pixel has three channels of red, green, and blue. In addition, all dimensions of the second tensor are not higher than the corresponding dimensions of the first tensor, and at least one dimension of the second tensor is lower than the corresponding dimension of the first tensor.

S301. Update stride in the foregoing different dimension to a predetermined value.

Each dimension of the tensor in the present disclosure has corresponding stride. The stride in each dimension of the tensor may be used to determine a reading start position when data is read from a buffer module. The stride in each dimension of the tensor is usually a preset known value. A value of the stride in each dimension of the tensor is usually related to a storage manner of the tensor in the buffer module. The storage manner of the tensor in the buffer module may be related to a calculation processing capability of a data processing unit that is configured to perform a binary calculation. The predetermined value in the present disclosure is generally a preset known value. For example, the predetermined value is 0. According to the present disclosure, the stride in the dimension in the second tensor not different from the dimension of the first tensor does not need to be updated.

S302. Read a to-be-operated data block of the second tensor from a buffer module based on updated stride with the foregoing predetermined value in each dimension of the second tensor.

The to-be-operated data block in the present disclosure is a data block for which padding processing is performed. To be specific, the second tensor performed with the padding processing is stored in the buffer module in the present disclosure, and content read from the buffer module each time may be at least a part of the second tensor performed with the padding processing. A size of the to-be-operated data block is usually related to basic calculation granularity of a data processing chip that performs a binary operation. The size of the to-be-operated data block in the present disclosure may refer to a number of data contained in the to-be-operated data block. For example, if the data processing chip can simultaneously perform m numbers of calculations at a time, the to-be-operated data block may include m numbers of data.

S303. Perform binary operation on the first tensor based on the to-be-operated data block of the second tensor.

The binary operation in the present disclosure may refer to an operation based on binary operators. For example, the binary operators may include addition, multiplication, intersection, union, and the like. The binary operation for the second tensor and the first tensor in the present disclosure may be referred to as broadcasting. Broadcasting in the present disclosure may refer to arithmetic operations performed on arrays with different shapes.

According to the present disclosure, through updating the stride in the different dimension of the second tensor, a reading position of the buffer module may be positioned to a position of the data block for which padding processing is performed. Updating of the stride, positioning of the reading position of the buffer module, the padding processing, and other operations may be performed by means of compiling. Therefore, during implementation of the embodiments of the present disclosure, according to the present disclosure, without hardware supporting broadcasting, a binary operation between tensors with different dimensions may be quickly performed by reading the to-be-operated data block from a corresponding reading position and enabling the data processing unit to perform an existing binary operation on the first tensor and the read to-be-operated data block. In view of the above, according to the technical solutions provided in the present disclosure, a binary operation may be performed for tensors with different dimensions without difficulty of hardware design being increased.

In an optional example, when the technical solutions of the present disclosure are applicable to the field of image processing, the dimensions of the first tensor in the present disclosure may include a width dimension, a height dimension, and a channel dimension. Moreover, the second tensor in the present disclosure may also include a width dimension, a height dimension, and a channel dimension. For example, the first tensor is a tensor with a width dimension of 4, a height dimension of 4, and a channel dimension of 8 (which may be recorded as a tensor of 4h4w8c). According to the present disclosure, the dimension different from the dimension of the first tensor may be determined from the second tensor based on the width dimensions, the height dimensions, and the channel dimensions of the first tensor and the second tensor. In other words, according to the present disclosure, the dimension of the second tensor different from the dimension of the first tensor may be determined based on the width dimensions, the height dimensions, and the channel dimensions of the first tensor and the second tensor. For example, if the width dimension of the second tensor is different from that of the first tensor, while the height dimension of the second tensor is the same as that of the first tensor and the channel dimension of the second tensor is the same as that of the first tensor, the width dimension of the second tensor is the different dimension in the present disclosure.

According to the present disclosure, by using the first tensor and the second tensor that have width dimensions, height dimension, and channel dimensions, without hardware supporting broadcasting, a binary operation for two tensors with different dimensions may be quickly performed during an image processing process on the basis that the updating of the stride, the positioning of the reading position of the buffer module, the padding processing, and other operations are performed by means of compiling. In this way, the binary operation for tensors during the image processing process may be achieved without difficulty of hardware design being increased.

In an optional example, the buffer module in the present disclosure specifically may be an SRAM (static random access memory) or the like. According to the present disclosure, each time a data block of the second tensor may be read from the buffer module by using a start address of the second tensor and a corresponding first offset address, as the to-be-operated data block of the second tensor. The start address of the second tensor in the present disclosure is usually a known value. For example, the start address of the second tensor may be set while storing the second tensor. The start address of the second tensor in the present disclosure may refer to a buffer start address of the second tensor in the buffer module. The first offset address in the present disclosure may refer to an address offset on the basis of the start address of the second tensor. The start address of the second tensor and the first offset address in the present disclosure are mainly used to determine a start address for reading from the buffer module at this time.

Optionally, the buffer module (such as SRAM) in the present disclosure usually includes a plurality of rows and a plurality of columns. SRAM in the present disclosure may be as shown in Table 1 below as an example.

operated data block of the second tensor may be read from the SRAM by using the start address of the second tensor and the first offset address. For example, according to the present disclosure, data at a row may be read from the SRAM at a time according to the start address of the second tensor and the first offset address.

Optionally, during execution of the binary operation for the first tensor and the second tensor, according to the present disclosure, a first offset address for a to-be-operated data block of the second tensor may be calculated at a time by using the updated stride in each dimension of the second tensor. The foregoing updated stride in each dimension of the second tensor generally includes a predetermined value. Subsequently, according to the present disclosure, a to-be-operated data block of the second tensor may be read from the buffer module according to the start address of the second tensor and the currently calculated first offset address, so as to perform the binary operation on the first tensor by using the currently read to-be-operated data block. A size of the to-be-operated data block is usually a known value. The size of the to-be-operated data block may usually be set according to an actual situation of the data processing chip.

Optionally, it is assumed that the second tensor is a tensor with an input dimension of n, a width dimension of w, a height dimension of h, and a channel dimension of c, for example, the second tensor may be a tensor of n4h4w8c; and the SRAM in the present disclosure has a storage structure shown in Table 1. In this case, a data block of 4h4w8c may be stored in a row in the SRAM. According to the present disclosure, the first offset address may be calculated by using the following formula (1):

$$\text{Offset}(n,c,h,w) = n \times \text{stride\_}n + (c/8) \times \text{stride\_}c + (h14) \times \text{stride\_}h + (w/4) \times \text{stride\_}w + (h\%4) \times 8 \times 4 + (w\%4) \times 8 + (c\%8) \quad \text{Formula (1)}$$

In the foregoing formula (1), stride_n indicates stride in the input dimension n; stride_c indicates stride in the channel dimension c; stride_h indicates stride in the height dimension h; stride_w indicates stride in the width dimension w; n has a value range of 1 to n; w has a value range of 1 to w; c has a value range of 1 to c; and h has a value range of 1 to h. The quotient of division in formula (1) may be determined by rounding down. Values of stride_n, stri-

TABLE 1

| | Slice 0 | Slice 1 | Slice 2 | Slice 3 | Slice 4 | Slice 5 | Slice 6 | Slice 7 | Slice 8 | Slice 9 | Slice 10 | Slice 11 | Slice 12 | Slice 13 | Slice 14 | Slice 15 |
|---|---|---|---|---|---|---|---|---|---|---|---|---|---|---|---|---|
| Offset 0 | | | | | | | | | | | | | | | | |
| Offset 1 | | | | | | | | | | | | | | | | |
| Offset 2 | | | | | | | | | | | | | | | | |

Table 1 schematically shows 3 rows and 16 columns in the SRAM. A column in a row may be referred to as a slice, which may generally be used to store a plurality of data. For example, eight data may be stored in one slice. Specifically, if it is assumed that the channel dimensions of the first tensor and the second tensor are 8, data of eight channels of a pixel may be stored in one slice in the SRAM. 16×8=128 data may be stored in a row in the SRAM shown in Table 1, and a row in the SRAM may be referred to as a buffer area. For the tensor of n4h4w8c, a data block of 4h4w8c may be stored in one buffer area.

There is an offset address at each row in the SRAM shown in Table 1, that is, the first offset address in the present disclosure. According to the present disclosure, the to-bede_c, stride_h and stride_w are usually determined by the compiler, and the value of at least one of stride_n, stride_c, stride_h, and stride_w may be 0.

According to the present disclosure, by calculating the first offset address by using the updated stride in each dimension of the second tensor, a reading start address of the to-be-operated data block of the second tensor which needs to be read at this time may be conveniently obtained. In this way, the to-be-operated data block of the second tensor is conveniently obtained, thereby improving efficiency of the binary operation for two tensors.

In an optional example, according to the present disclosure, when reading the to-be-operated data block of the second tensor from the buffer module, the start address for reading from the buffer module may be first determined according to the start address of the second tensor and the first offset address (for example, the first offset address calculated by using the foregoing formula (1)); and then the to-be-operated data block of the second tensor may be read from the buffer module based on the basic calculation granularity of the data processing chip performing the binary operation and the foregoing start address. The basic calculation granularity in the present disclosure may be used to determine a number of data to be read from the buffer module every time.

Optionally, basic data storage units exist in the buffer module in the present disclosure. If a storage space occupied by data is smaller than a storage space of a basic data storage unit, the data still occupies a basic data storage unit, although the data cannot pad out a basic data storage unit. A buffer area occupied by the to-be-operated data block in the present disclosure may be a basic data storage unit of the buffer module. A size of the basic data storage unit in the present disclosure may be set in consideration of the basic calculation granularity of the data processing chip performing the binary operation. In other words, all data read from a basic data storage unit of the buffer module at a time may enable the data processing chip to perform, one time, binary operation that is based on the basic calculation granularity.

For example, regarding the SRAM shown in Table 1, according to the present disclosure, each row in the SRAM may be taken as an SRAM block. In other words, each row in the SRAM is a basic data storage unit of the SRAM.

Optionally, according to the present disclosure, when reading data from the SRAM, data stored in one SRAM block may be read at a time. For example, if the reading start address determined according to the start address of the second tensor and the first offset address corresponds to the second row in Table 1, according to the present disclosure, 128 data buffered in the second row in the SRAM shown in Table 1 may be directly read, as the to-be-operated data block of the second tensor read at this time. Meanwhile, the basic calculation granularity of the data processing chip performing the binary operation in the present disclosure may be 128. In this case, the data processing chip may simultaneously perform binary operations with the first tensor for the 128 data read at this time.

According to the present disclosure, determining a start address for this reading by using the start address of the second tensor and the first offset address and reading the to-be-operated data block of the second tensor based on the basic calculation granularity not only facilitate quick positioning of the to-be-operated data block, but also may make all to-be-operated data blocks read at a time be provided to the data processing chip for a binary operation. In this way, computing resources of the data processing chip are made full use of, thereby improving calculation efficiency of the data processing chip.

In an optional example, the to-be-operated data block of the second tensor in the present disclosure may be a data block for which padding processing is performed. In other words, according to the present disclosure, padding processing may be performed for valid data of the second tensor, so as to form the to-be-operated data block of the second tensor. Padding processing for the valid data of the second tensor may be performed by means of copying valid data. For example, the valid data of the second tensor is copied and is concated with the copied valid data. A result of the concating is the to-be-operated data block of the second tensor.

Optionally, according to the present disclosure, when performing padding processing on the valid data of the second tensor, if valid data buffered in a basic data storage unit of a buffer module occupies a part of the basic data storage unit, the valid data may be copied according to the present disclosure, and the copied valid data may be stored in other part of the basic data storage unit. In other words, a basic data storage unit is padded out with valid data buffered in the basic data storage unit.

Optionally, according to the present disclosure, the padding processing for the valid data of the second tensor may be performed by using a hardware padding instruction. For example, according to the present disclosure, a FetchRoi instruction may be used to copy all data stored in a slice in a basic data storage unit shown in Table 1 to other slices in the basic data storage unit. For another example, according to the present disclosure, a ReplaceC instruction may be used to copy a certain data stored in a slice in a basic data storage unit shown in Table 1 to a corresponding position in another basic data storage unit.

According to the present disclosure, by copying the valid data of the second tensor, the to-be-operated data block of the second tensor may be conveniently formed, thereby facilitating convenient execution of the binary operation for the first tensor and the second tensor.

In an optional example, according to the present disclosure, after the second tensor is buffered in a corresponding buffer area, the valid data of the second tensor that has been buffered may be copied, so as to form the to-be-operated data block of the second tensor. A specific example is shown in FIG. 4.

S400. Buffer valid data of the second tensor into the buffer module based on non-updated stride in each dimension of the second tensor.

Optionally, according to the present disclosure, a respective storage position for each valid data of the second tensor in the buffer module may be determined by using the non-updated stride in each dimension of the second tensor, and each valid data of the second tensor may be respectively stored at the corresponding storage position in the buffer module. An example of buffering the valid data of the second tensor in the present disclosure is shown in FIG. 5.

S401. Determine a buffer area of the valid data for padding processing in the buffer module based on the updated stride with the predetermined value in each dimension of the second tensor.

Optionally, according to the present disclosure, the updated stride with the predetermined value in each dimension of the second tensor may be put into the foregoing formula (1), so that a plurality of offset addresses may be calculated. According to the present disclosure, valid data in a buffer area corresponding to each offset address may be taken as the valid data for padding processing.

S402. Copy the valid data in the foregoing determined buffer area and pad out the corresponding buffer area with the copied valid data, to form the to-be-operated data block of the second tensor.

Optionally, according to the present disclosure, repeating and padding of the valid data may be performed by using at least one of the FetchRoi instruction and the ReplaceC instruction. The FetchRoi instruction is used to copy valid data buffered in a basic data storage unit in the buffer module into another basic data storage unit. For example, according to the present disclosure, the FetchRoi instruction may be used to copy eight valid data (for example, valid data 0 to valid data 7) buffered in one slice shown in Table 1 into another slice, so that the same eight valid data are buffered in two slices (for example, the valid data 0 to the valid data 7 are buffered in both of the slices). The ReplaceC instruction is used to pad a basic data storage unit by using valid data buffered in the basic data storage unit in the buffer module. For example, according to the present disclosure, the ReplaceC instruction may be used to copy one of valid data (for example, the valid data 0) buffered in a slice shown in Table 1, and pad the slice with the copied valid data, so that eight same valid data (for example, the valid data 0) are buffered in the slice.

Optionally, according to the present disclosure, the to-be-operated data block of the second tensor usually needs to be formed by a combination of the FetchRoi instruction and the ReplaceC instruction. For example, if the dimensions of the first tensor are 4×4×8 (w×h×c) and the dimensions of the second tensor are 1×1×1 (w×h×c), a process of obtaining the to-be-operated data block of the second tensor in the present disclosure may be described as follows.

First, the ReplaceC instruction is used for seven times successively to copy a valid data buffered in a basic data storage unit in the buffer module, and the basic data storage unit is padded with seven copied data, so that eight same data are stored in the basic data storage unit.

Subsequently, the FetchRoi instruction may be used for multiple times successively to copy all the data buffered in a basic data storage unit in the buffer module to other basic data storage units. For example, the FetchRoi instruction is used for three times successively to copy all data buffered in a basic data storage unit in the buffer module to basic data storage units corresponding to all offset addresses calculated by using w=0, and the FetchRoi instruction is used for three times successively to copy all data buffered in a basic data storage unit in the buffer module to basic data storage units corresponding to all offset addresses calculated by using h=0.

According to the present disclosure, a buffer area is padded with the valid data in a buffer area. In this way, a to-be-operated data block formed by the valid data may be stored in the buffer area without changing buffer positions of other buffered data, thereby facilitating convenient execution of the binary operation for the tensors.

In an optional example, an example of buffering the valid data of the second tensor into the buffer module in the present disclosure is shown in FIG. 5.

In FIG. 5, S500. Calculate a second offset address for the valid data of the second tensor based on the non-updated stride in each dimension of the second tensor.

Optionally, according to the present disclosure, an offset address for the valid data of the second tensor may be calculated by using the foregoing formula (1), so as to obtain the second offset address for the valid data of the second tensor. In other words, according to the present disclosure, the second offset address for each valid data of the second tensor may be obtained by putting the non-updated stride in each dimension of the second tensor into the formula (1).

S501. Buffer the valid data into a corresponding buffer area according to the start address of the second tensor and the second offset address.

Optionally, the valid data of the second tensor in the present disclosure may be buffered in a buffer area of the buffer module in a non-close arrangement. To be specific, the valid data in a buffer area of the second tensor may not occupy the entire buffer area, but occupies only a part of the buffer area. For example, 16 slices in a row of Table 1 form a buffer area, and the valid data of the second tensor occupies merely one slice in a buffer area shown in Table 1.

Optionally, according to the present disclosure, a writing start address for each valid data of the second tensor may be first determined according to the start address of the second tensor and the second offset address. Subsequently, the valid data is further buffered into the buffer area of the buffer module based on the basic calculation granularity of the data processing chip performing the binary operation and the writing start address. A size of the buffer area is the same as that of the basic calculation granularity.

Optionally, according to the present disclosure, the second offset address for each valid data of the second tensor may be obtained by putting the non-updated stride in each dimension of the second tensor into the foregoing formula (1).

According to the present disclosure, a buffer position of the valid data may be conveniently positioned through determining, by using the start address of the second tensor and the second offset address, the writing start address for the valid data that needs to be buffered; and through writing the valid data into a corresponding buffer area based on the basic calculation granularity, padding processing may be performed on the valid data without changing buffer positions of other buffered data. Moreover, the to-be-operated data block for which padding processing is performed is buffered. In this case, convenient execution of the binary operation for the tensors is facilitated.

Exemplary Apparatus

FIG. 6 is a schematic structural diagram of a service discovery apparatus according to an embodiment of the present disclosure. The apparatus in this embodiment may be configured to implement the corresponding method embodiments of the present disclosure. The apparatus shown in FIG. 6 includes a dimension difference determining module 600, a stride updating module 601, a data reading module 602, and an operation performing unit 603. Optionally, the apparatus may further include a padding module 604.

The dimension difference determining module 600 is configured to determine, from a second tensor, a dimension different from a dimension of a first tensor based on dimensions of the first tensor and dimensions of the second tensor.

The stride updating module 601 is configured to update stride in the different dimension determined by the dimension difference determining module 600 to a predetermined value.

The data reading module 602 is configured to read a to-be-operated data block of the second tensor from a buffer module based on stride with the predetermined value that is in each dimension of the second tensor and is updated by the stride updating module 601. The to-be-operated data block is a data block for which padding processing is performed.

The operation performing unit 603 is configured to perform binary operation on the first tensor based on the to-be-operated data block of the second tensor read by the data reading module 602.

Optionally, the dimension difference determining module 600 is configured to determine, from the second tensor, the dimension different from the dimension of the first tensor based on width dimensions, height dimensions, and channel dimensions of the first tensor and the second tensor.

Optionally, the data reading module 602 may include an offset address calculation submodule 6021 and a data reading submodule 6022. The offset address calculation submodule 6021 is configured to calculate a first offset address for the to-be-operated data block of the second tensor based on the stride with the predetermined value that is in each dimension of the second tensor and is updated by the stride updating module 601. The data reading submodule 6022 is configured to read the to-be-operated data block of the second tensor from the buffer module based on a start address of the second tensor and the first offset address obtained by the offset address calculation submodule 6021.

Optionally, the data reading submodule 6022 may first determine a start address for reading from the buffer module according to the start address of the second tensor and the first offset address obtained by the offset address calculation submodule 6021. Subsequently, the data reading submodule 6022 reads the to-be-operated data block of the second tensor from the buffer module based on basic calculation granularity of a data processing chip performing the binary operation and the start address determined by the data reading submodule 6022.

The padding module 604 may be configured to perform padding processing on the second tensor through copying valid data of the second tensor, to form the to-be-operated data block of the second tensor.

Optionally, the padding module 604 may first buffer the valid data of the second tensor into the buffer module based on non-updated stride in each dimension of the second tensor. Subsequently, the padding module 604 determines, based on the stride with the predetermined value that is in each dimension of the second tensor and is updated by the stride updating module 601, a buffer area of the valid data for padding processing in the buffer module. The padding module 604 copies the valid data in the buffer area and pads out the buffer area with the copied valid data, to form the to-be-operated data block of the second tensor.

Optionally, the padding module 604 calculates a second offset address for the valid data of the second tensor based on the non-updated stride in each dimension of the second tensor; and buffers the valid data into the buffer area according to the start address of the second tensor and the second offset address.

More specifically, the padding module 604 may determine a writing start address for the valid data according to the start address of the second tensor and the second offset address, and buffers the valid data into the buffer area of the buffer module based on the basic calculation granularity of the data processing chip performing the binary operation and the foregoing writing start address. A size of the buffer area is the same as that of the basic calculation granularity.

Exemplary Electronic Device

An electronic device according to an embodiment of the present disclosure is described below with reference to FIG. 7. FIG. 7 shows a block diagram of an electronic device according to an embodiment of the present disclosure. As shown in FIG. 7, an electronic device 71 includes one or more processors 711 and a memory 712.

The processor 711 may be a central processing unit (CPU) or another form of processing unit having a data processing capability and/or an instruction execution capability, and may control another component in the electronic device 71 to perform a desired function.

The memory 712 may include one or more computer program products. The computer program product may include various forms of computer readable storage media, such as a volatile memory and/or a non-volatile memory. The volatile memory may include, for example, a random access memory (RAM) and/or a cache. The nonvolatile memory may include, for example, a read-only memory (ROM), a hard disk, and a flash memory. One or more computer program instructions may be stored on the computer readable storage medium. The processor 711 may execute the program instruction to implement the method for calculating tensor data based on a computer according to the foregoing various embodiments of the present disclosure and/or other desired functions. Various contents such as an input signal, a signal component, and a noise component may also be stored in the computer readable storage medium.

In an example, the electronic device 71 may further include an input device 713 and an output device 714. These components are connected with each other through a bus system and/or another form of connection mechanism (not shown). In addition, the input device 713 may further include, for example, a keyboard and a mouse. The output device 714 may output various information to the outside. The output device 714 may include, for example, a display, a loudspeaker, a printer, a communication network, and a remote output device connected by the communication network.

Certainly, for simplicity, FIG. 7 shows only some of components in the electronic device 71 that are related to the present disclosure, and components such as a bus and an input/output interface are omitted. In addition, according to specific application situations, the electronic device 71 may further include any other appropriate components.

Exemplary Computer Program Product and Computer Readable Storage Medium

In addition to the foregoing method and device, the embodiments of the present disclosure may further relate to a computer program product, which includes a computer program instruction. When executing the computer program instruction, the processor is enabled to perform the steps, of the method for calculating tensor data based on a computer or a probability prediction method based on a language model according to the embodiments of the present disclosure, that are described in the "exemplary method" part of this specification.

The computer program product may be program code, written with one or any combination of a plurality of programming languages that is configured to perform the operations in the embodiments of the present disclosure. The programming languages include an object-oriented programming language such as Java or C++, and further include a conventional procedural programming language such as a "C" language or a similar programming language. The program code may be entirely or partially executed on a user computing device, executed as an independent software package, partially executed on the user computing device and partially executed on a remote computing device, or entirely executed on the remote computing device or a server.

In addition, the embodiments of the present disclosure may further relate to a computer readable storage medium, which stores a computer program instruction. When executing the computer program instruction, the processor is enabled to perform the steps, of the method for calculating tensor data based on a computer according to the embodiments of the present disclosure, that are described in the "exemplary method" part of this specification.

The computer readable storage medium may be one readable medium or any combination of a plurality of readable media. The readable medium may be a readable signal medium or a readable storage medium. The readable storage medium may include, for example, but not limited to electricity, magnetism, light, electromagnetism, infrared ray, or a semiconductor system, apparatus or device, or any combination of the above. More specific examples (a non-exhaustive list) of the readable storage medium include: an electrical connection with one or more conducting wires, a portable disk, a hard disk, a random access memory (RAM), a read-only memory (ROM), an erasable programmable read-only memory (EPROM or flash memory) or a flash memory, an optical fiber, a portable compact disk read-only memory (CD-ROM), an optical storage device, a magnetic storage device, or any suitable combination of the above.

Basic principles of the present disclosure are described above in combination with the specific embodiments. However, it should be pointed out that the advantages, superiorities, and effects mentioned in the present disclosure are merely examples but are not for limitation, and it cannot be considered that these advantages, superiorities, and effects are necessary for each embodiment of the present disclosure. In addition, specific details of the above disclosure are merely for examples and for ease of understanding, rather than limitations. The foregoing details do not limit that the present disclosure must be implemented by using the foregoing specific details.

The various embodiments in this specification are all described in a progressive way, and each embodiment focuses on a difference from other embodiments. For same or similar parts among the various embodiments, reference may be made to each other. The system embodiments basically correspond to the method embodiments, and thus are relatively simply described. For related parts, reference may be made to a part of the descriptions of the method embodiments.

The block diagrams of the equipment, the apparatus, the device, and the system involved in the present disclosure are merely exemplary examples and are not intended to require or imply that the equipment, the apparatus, the device, and the system must be connected, arranged, and configured in the manners shown in the block diagrams. It is recognized by a person skilled in the art that, the equipment, the apparatus, the device, and the system may be connected, arranged, and configured in an arbitrary manner. The terms such as "include", "contain", and "have" are open terms that mean "including but not limited to", and may be used interchangeably with "including but not limited to". The terms "or" and "and" used herein refer to the term "and/or", and may be used interchangeably with "and/or', unless the context clearly indicates otherwise. The term "such as" used herein refers to the phrase "such as but not limited to", and may be used interchangeably with "such as but not limited to".

The method and the apparatus in the present disclosure may be implemented in many ways. For example, the method and the apparatus in the present disclosure may be implemented by software, hardware, firmware, or any combination of the software, the hardware, and the firmware. The foregoing sequence of the steps of the method is for illustration only, and the steps of the method in the present disclosure are not limited to the sequence specifically described above, unless otherwise specifically stated in any other manner. In addition, in some embodiments, the present disclosure may also be implemented as programs recorded in a recording medium. These programs include machine-readable instructions for implementing the method according to the present disclosure. Therefore, the present disclosure further relates to a recording medium storing a program for implementing the method according to the present disclosure.

It should be further pointed out that, various components or various steps in the apparatus, the device, and the method of the present disclosure may be disassembled and/or recombined. These disassembled and/or recombined components or steps shall be regarded as equivalent solutions of the present disclosure.

The foregoing description about the disclosed aspects is provided, so that the present disclosure can be arrived at or carried out by any person skilled in the art. Various modifications to these aspects are very obvious to a person skilled in the art. Moreover, general principles defined herein may be applicable to other aspects without departing from the scope of the present disclosure. Therefore, the present disclosure is not intended to be limited to the aspect illustrated herein, but to the widest scope consistent with the principles and novel features disclosed herein.

The foregoing description has been given for illustration and description. In addition, this description is not intended to limit the embodiments of the present disclosure to forms disclosed herein. Although a plurality of exemplary aspects and embodiments have been discussed above, a person skilled in the art may recognize certain variations, modifications, changes, additions, and sub-combinations thereof.

What is claimed is:

1. A method for calculating tensor data using a data processing chip of a computer, including:

determining a first dimension of a second tensor different from a corresponding dimension of a first tensor based on dimensions of the first tensor and dimensions of the second tensor;

updating, by means of compiling, a stride value associated with the first dimension of the second tensor, wherein the stride value is a predetermined value;

reading a target data block of the second tensor from a buffer module based on an updated stride value that is equal to the predetermined value in each dimension of the second tensor, wherein the target data block is a padded data block, by means of compiling, whose size is equal to its size before padded plus a size of padding data, wherein a reading position of the buffer module which is determined by the updated stride value, is positioned, by means of compiling, to a position of the target data block; and performing binary operation on data blocks of the first tensor based on the target data block of the second tensor; wherein before updating stride in the different dimension to a predetermined value, the method further includes: performing padding processing on the second tensor through copying valid data of the second tensor to form the to-be-operated data block of the second tensor; wherein the performing padding processing on the second tensor through copying valid data of the second tensor to form the to-be-operated data block of the second tensor includes: buffering the valid data of the second tensor into the buffer module based on non-updated stride in each dimension of the second tensor; determining a buffer area, in the buffer module, of the valid data for padding processing based on the updated stride with the predetermined value in each dimension of the second tensor; and copying the valid data in the buffer area and padding out the buffer area with the copied valid data, to form the to-be-operated data block of the second tensor; wherein the buffering the valid data of the second tensor into the buffer module based on non-updated stride in each dimension of the second tensor includes: calculating a second offset address for the valid data of the second tensor based on the non-updated stride in each dimension of the second tensor; and buffering the valid data into the buffer area according to the start address of the second tensor and the second offset address.

2. The method according to claim 1, wherein the determining, from a second tensor, a dimension different from a dimension of a first tensor based on dimensions of the first tensor and dimensions of the second tensor includes:

determining, from the second tensor, the dimension different from the dimension of the first tensor based on width dimensions, height dimensions, and channel dimensions of the first tensor and the second tensor.

3. The method according to claim 1, wherein the reading a to-be-operated data block of the second tensor from a buffer module based on updated stride with the predetermined value in each dimension of the second tensor includes:
   calculating a first offset address for the to-be-operated data block of the second tensor based on the updated stride with the predetermined value in each dimension of the second tensor; and
   reading the to-be-operated data block of the second tensor from the buffer module based on a start address of the second tensor and the first offset address.

4. The method according to claim 3, wherein the reading the to-be-operated data block of the second tensor from the buffer module based on a start address of the second tensor and the first offset address includes:
   determining a start address for reading from the buffer module according to the start address of the second tensor and the first offset address; and
   reading the to-be-operated data block of the second tensor from the buffer module based on basic calculation granularity of a data processing chip performing the binary operation and the start address.

5. A non-transitory computer readable storage medium, wherein the non-transitory storage medium stores a computer program, and the computer program is used for implementing the method according to claim 1.

6. An electronic device, including:
a processor; and
a memory, configured to store a processor-executable instruction, wherein
the processor is configured to read the executable instruction from the memory, and execute the instruction to implement the method according to claim 1.

7. An electronic device, including:
a processor; and
a memory, configured to store a processor-executable instruction, wherein
the processor is configured to read the executable instruction from the memory, and execute the instruction to implement the method according to claim 2.

8. An electronic device, including:
a processor; and
a memory, configured to store a processor-executable instruction, wherein the processor is configured to read the executable instruction from the memory, and execute the instruction to implement the method according to claim 3.

9. An electronic device, including:
a processor; and
a memory, configured to store a processor-executable instruction, wherein the processor is configured to read the executable instruction from the memory, and execute the instruction to implement the method according to claim 4.

10. An electronic device, including:
a processor; and
a memory, configured to store a processor-executable instruction, wherein
the processor is configured to read the executable instruction from the memory, and execute the instruction to implement the method according to claim 1.

11. An electronic device, including:
a processor; and
a memory, configured to store a processor-executable instruction, wherein
the processor is configured to read the executable instruction from the memory, and execute the instruction to implement the method according to claim 1.

12. A non-transitory computer readable storage medium, wherein the non-transitory storage medium stores a computer program, and the computer program is used for implementing the method according to claim 2.

13. A non-transitory computer readable storage medium, wherein the non-transitory storage medium stores a computer program, and the computer program is used for implementing the method according to claim 3.

14. A non-transitory computer readable storage medium, wherein the non-transitory storage medium stores a computer program, and the computer program is used for implementing the method according to claim 4.

15. A non-transitory computer readable storage medium, wherein the non-transitory storage medium stores a computer program, and the computer program is used for implementing the method according to claim 1.

16. A non-transitory computer readable storage medium, wherein the non-transitory storage medium stores a computer program, and the computer program is used for implementing the method according to claim 1.

* * * * *